Figure 1:
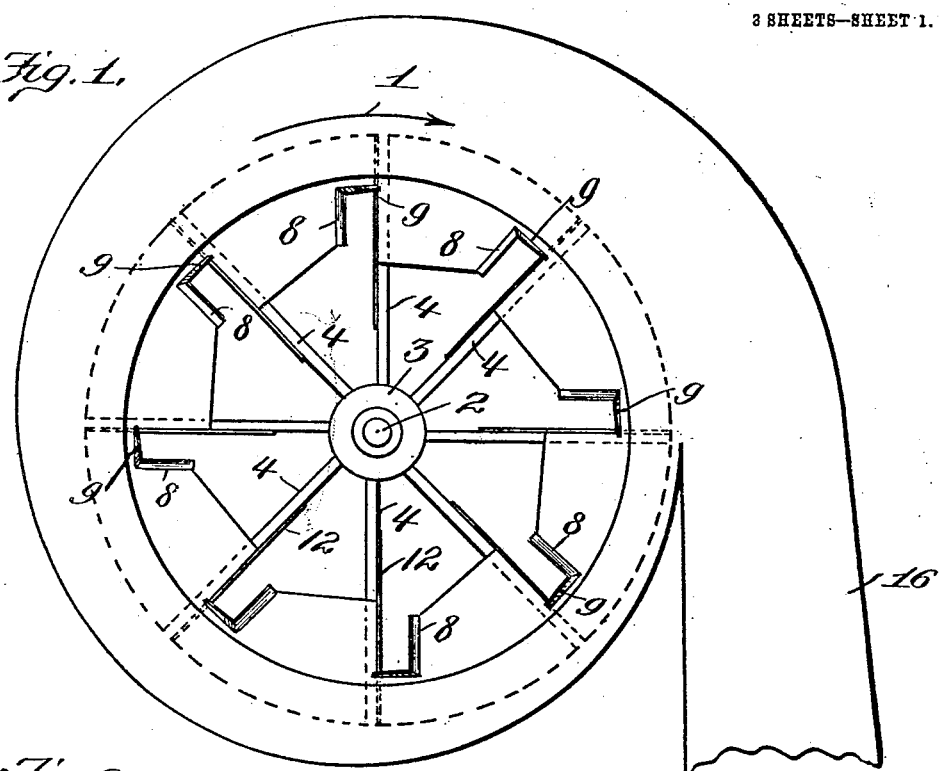

No. 851,457. PATENTED APR. 23, 1907.
J. VERNER.
CENTRIFUGAL FAN.
APPLICATION FILED AUG. 2, 1906.

3 SHEETS—SHEET 1.

Witnesses:
Inventor
John Verner
By James L. Norris
Atty

No. 851,457. PATENTED APR. 23, 1907.
J. VERNER.
CENTRIFUGAL FAN.
APPLICATION FILED AUG. 2, 1906.

3 SHEETS—SHEET 2.

No. 851,457. PATENTED APR. 23, 1907.
J. VERNER.
CENTRIFUGAL FAN.
APPLICATION FILED AUG. 2, 1906.
3 SHEETS—SHEET 3.
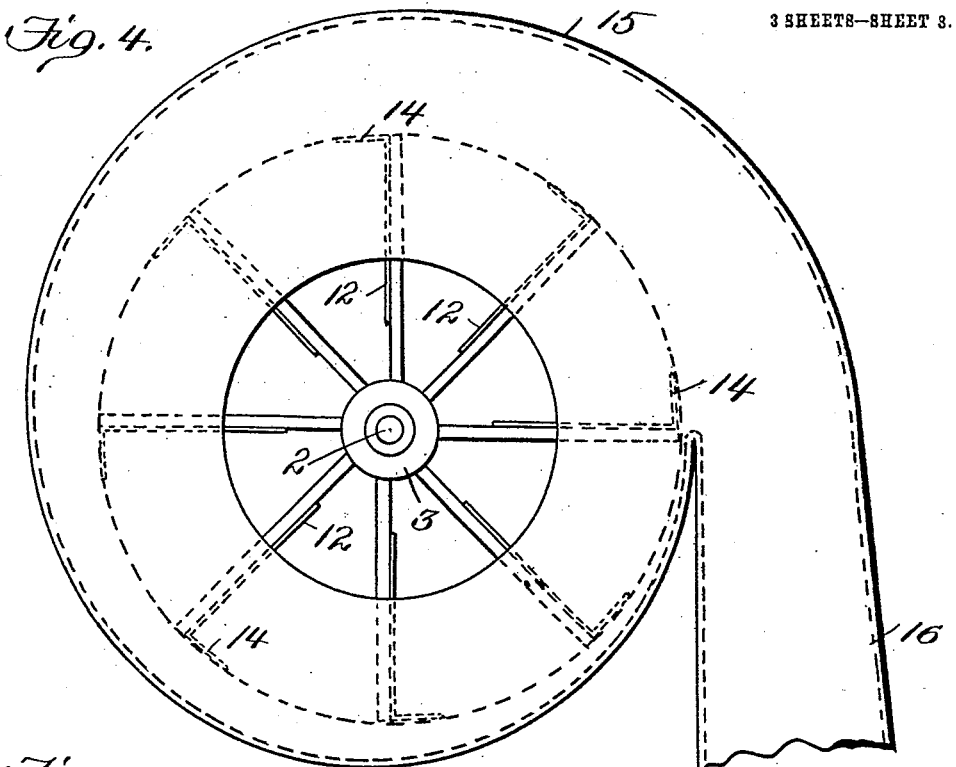
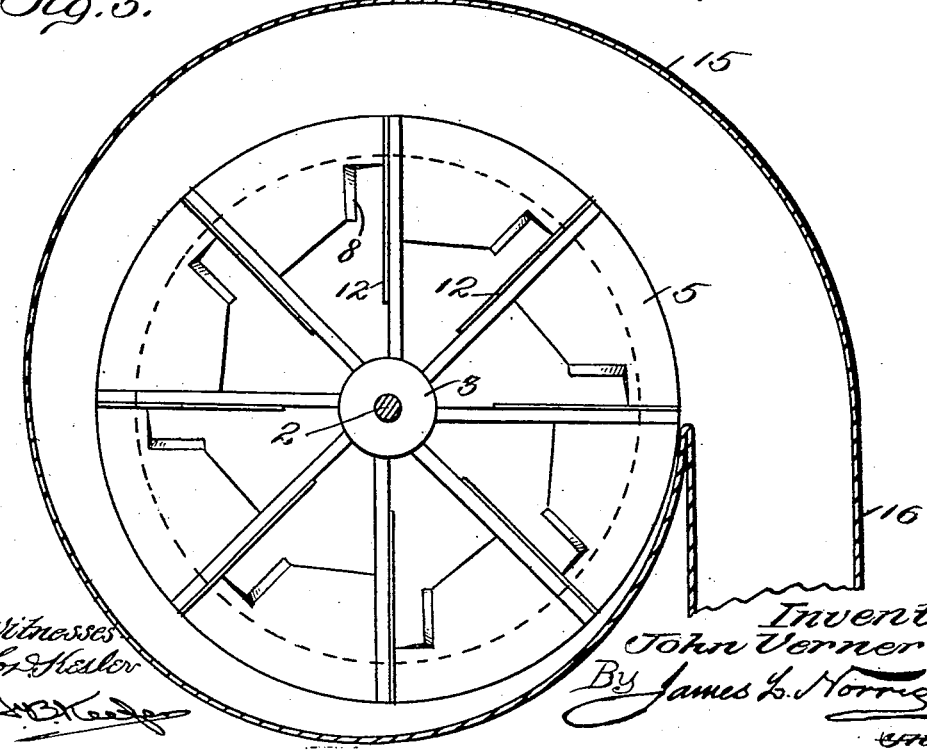
Witnesses
Inventor
John Verner
By James L. Norris
Atty.

UNITED STATES PATENT OFFICE.

JOHN VERNER, OF CHARITON, IOWA.

CENTRIFUGAL FAN.

No. 851,457.　　　　Specification of Letters Patent.　　　　Patented April 23, 1907.

Application filed August 2, 1906. Serial No. 328,922.

*To all whom it may concern:*

Be it known that I, JOHN VERNER, a citizen of the United States, residing at Chariton, in the county of Lucas and State of Iowa, have invented new and useful Improvements in Centrifugal Fans, of which the following is a specification.

This invention relates to centrifugal fans adapted for ventilating and other purposes, and particularly applicable for use in connection with mines or other places where large air volumes must be supplied. The fan, however, is not confined in its use or application.

The invention contains several novel features which are believed to be new in the construction of centrifugal fans. The combination of all the improved features represents the invention in its entirety and greatest usefulness; yet either of these features, or some combination of them, has sufficient and specific value to materially increase the efficiency of revolution of any fan provided with such feature or features.

The first important feature consists of a straight plate fixed at right angles to the rear side of each radial blade and near the outer extremity of the latter, the purpose of this plate being to utilize with greater advantage the power of the partial vacuum set up immediately in rear of the radial blades when the fan is in motion. By using this plate attachment the air required to fill this partial vacuum will be taken through the central intake openings or eyes of the fan instead of being largely supplied from the air that has already passed through the fan and contained adjacent to its periphery in the expansion chamber hereinafter set forth. Injurious eddies at the fan's periphery and the re-use of the air after its passage through the fan are also avoided by the provision of this plate structure. The plate structure also acts as a support for the air contained in the expansion chamber.

A second important feature of the invention consists of auxiliary intake openings located adjacent to and in rear of the side edges of each radial blade and provided with deflectors. The purpose of these openings and their equipments is to provide the most useful and direct means of drawing air into the fan to fill up the partial vacuum formed in the immediate rear of the radial blades when the fan is in motion, and also to facilitate the entrance of a large volume of air into the body of the fan at a point where it can be used to the best advantage, namely, at the forward portion of the space between the two adjacent blades.

The third important feature of the invention is the arrangement of the fan blades in series or sets of different lengths and so located with respect to the intake openings that a large flow of air through the fan can be produced and maintained while the forming of counter-currents and eddies in the fan is reduced to a minimum.

Other details of construction will be more fully hereinafter referred to.

Figure 2:
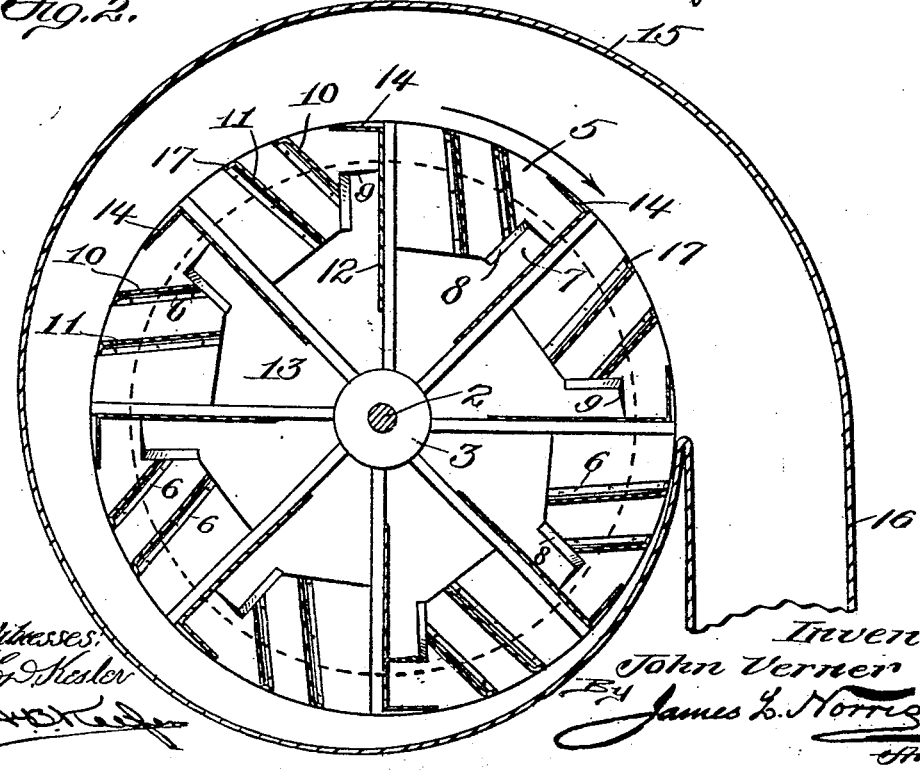
Figure 3:
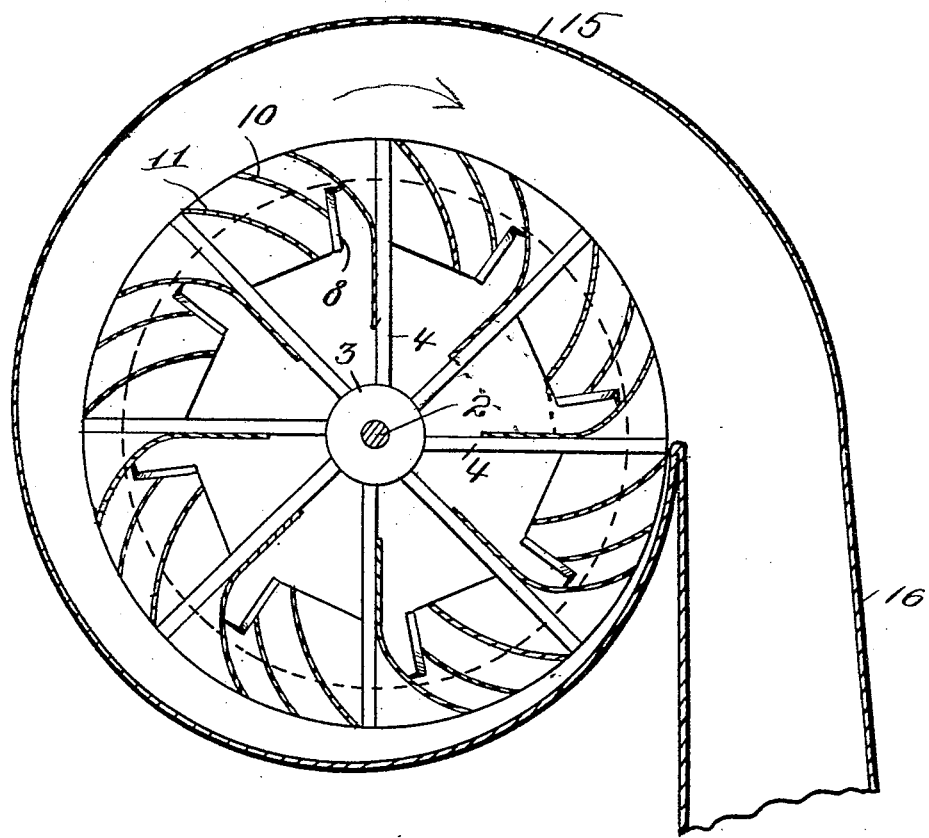

In the drawing: Figure 1 is a side elevation of a fan embodying the features of the invention. Fig. 2 is a section through the body of the fan and particularly showing the plate attachment to the radial straight blades. Fig. 3 is a view similar to Fig. 2 showing a slight modification. Fig. 4 is a view similar to Fig. 1 showing a fan with radial straight blades with angularly disposed plates on the rear sides at their outer ends. Fig. 5 is a view similar to Fig. 2, illustrating the use of the auxiliary intake openings in connection with a fan having radial straight blades.

Similar numerals of reference are employed to indicate corresponding parts in the several views.

The fan is intended to be rotated by suitable mechanism in any manner desired and from any source of power, the direction of rotation being indicated by the arrow 1. The fan structurally embodies a shaft 2 on which are secured hubs 3 and spi ers, n cluding radially projecting arms 4. To the outer ends of the arms 4, and forming the side portions of the body of the fan, are bolted, riveted, or otherwise affixed, metallic sheets or plates 5, these plates being preferably made of sheet metal, and in practice will be also of separate sections united to form complete rings at their outer extremities. The outer edges of the side plates or rings coincide with the periphery of the fan. Secured to the inner or adjacent faces of the side plates are angle brackets or irons 6, to which are attached the fan blades.

Cooperating with the blades of the fan are intake openings 7, which are formed in the side plates, and arranged close to the rear of each opening is a deflector 8, including a top shield or guard 9, each deflector 8 standing at a slight forward angle of inclination and advantageously co-operating with the blades of the fan, which will now be specifically described. The number of blades used in the construction of the fan is preferably twenty-four, arranged in eight sets, but a greater or less number may be employed. These blades may either be straight, as shown by Fig. 2, or they may be partly curved and partly straight, as shown by Fig. 3. The blades are preferably arranged in sets of three, designated by the numerals 10, 11 and 12. The blade 10 is the shortest of the set, and extends from a point along the rear edge of the intake opening 7 rearwardly and outwardly to the periphery of the fan. The blade 11 is longer than the blade 10, and is arranged parallel, or about parallel, to the latter blade. The blade 11 extends from the inner edge of the side sheets with which it cooperates in each instance adjacent to the outer limit of the fan eye or central opening 13 between the inner edges of the side plates and the center of the fan, and from the inner edge of the side plates the blade 11 also extends rearwardly and outwardly to the periphery of the fan. The blade 12 is the longest of the set, and preferably projects inwardly beyond the side plates one-third of its length, and thus is located a considerable distance into the central intake opening or fan eye 13. If this blade 12 is straight, as shown by Fig. 2, its disposition is preferably radial, or about radial, and extends as set forth, but if this blade 12 is formed as shown by Fig. 3 it will be arranged radially or about radially at its inner portion and the outer part thereof will curve rearwardly and outwardly to the periphery of the fan.

As shown by Fig. 2, a tangentially arranged plate 14 is rigidly secured to the side plates or sheets and to the rear side of the blade 12 in the series of the blades 10, 11 and 12, the said plate 14 being disposed at a right angle to the blade 12. The plate 14 engages the blade 12 a short distance inwardly from the outer end of the latter and extends rearwardly, as shown. This plate 14 is not used with the curved blades shown by Fig. 3.

The main or central intake openings 13 are not circular in form, as is the usual contour thereof in ordinary fans, but have straight edges owing to the particular arrangement and shaping of the side plates, and communicating therewith are the special or auxiliary intake openings 7, the latter being located, as heretofore set forth, immediately in rear of the blades 12 of the series of blades.

The fan is preferably mounted in an expanding casing 15 terminating in an expanding outlet 16, which may be connected either with the mine or place to be supplied with air, in the event the fan is used to force air inwardly, or with the outer air or atmosphere if the fan is employed to exhaust, which operations are obvious in all fan structures.

It is well known that the volumetric efficiency of fans is determined by the ratio between the cubical contents of the fan and the number of cubic feet of air delivered by it per revolution. To promote this efficiency the existence of the following favorable conditions is required:—The intake openings should be so designed as to facilitate the inflow of air and aid in securing a greater uniformity of supply to all parts of the fan. The effective suction power of the fan should be as large as circumstances will permit. The air entering through the intake openings should pass through the fan without being retarded by eddies and counter currents. Re-entry of air from the expanding casing into the fan should be prevented. The construction of fan as heretofore set forth meets the above required favorable conditions.

The peripheral organization of the fan under the present invention is such that the air after it has been conveyed into the expanding casing surrounding the fan is prevented from re-entering the latter. Air always moves from the point of greater density to that of less density, and as the air in the expanding casing is of greater density than the air entering the fan at the intake openings, and of least density just in rear of the blades, especially near the outer ends of the latter, it follows that, unless prevented, these points of least density will be supplied, partially at least, from the air in the expanding casing. This defect is especially pronounced in straight bladed fans. To avoid such re-entry of air, the plate 14 is provided, and in addition each of the blades 10 and 11 has a flange or narrow plate 17 at its outer end. The auxiliary intake openings 7 with the rear deflectors and upper guards 9 also perform an important part in the effective operation of the fan, and these intake openings and deflectors conjunctively cooperate with the special arrangement of the several series of blades and the plate 14 to overcome numerous deficiencies in fans as heretofore constructed.

Having thus described the invention, what is claimed is:

1. A fan having radially arranged blades, side plates extending to the periphery of the fan and having main intake openings at the center of the fan and also provided with auxiliary intake openings adjacent to and in rear of the side edges of the blades, the inner extremities of the auxiliary intake openings communicating with the central main intake openings.

2. A fan having radially arranged blades, side plates extending to the periphery of the fan, the side plates having main intake openings formed between the terminals of the same and the center of the fan, and also provided with auxiliary intake openings adjacent to and in rear of the side edges of the blades and communicating at their inner portions with the main intake openings at the fan center, and deflecting devices at the rear and over the outer portions of the auxiliary intake openings.

3. A fan having radially arranged blades, side plates extending to the periphery of the fan, the side plates having main intake openings formed therein at the center of the fan, and auxiliary intake openings adjacent to and in rear of the side edges of the radial blades and communicating at their inner portions with the said central main intake openings, deflecting devices at the rear and over the outer portions of the auxiliary intake openings, and angularly disposed plates co-operating with the rear sides of the outer ends of the blades.

4. A fan involving a plurality of blades arranged in series and differing in length, the longer blades being radial with respect to the fan and the shorter blades tangential to the center of the fan, side plates connected to the blades and extending to the periphery of the fan, the side plates having main intake openings formed therein at the center of the fan and also provided with auxiliary intake openings communicating at their inner portions with the central main intake openings and located adjacent to the longest blade of each series, deflecting devices at the rear and over the outer portions of the auxiliary intake openings, and angular plates cooperating with the outer ends of the blades.

5. A fan involving a plurality of blades arranged in series of different lengths, a portion of the blades being tangential of the center of the fan, side plates connected to the ends of the blades and extending to the periphery of the fan and provided with main intake openings at the center of the fan and also with auxiliary intake openings in rotary relation to the fan center and communicating at their inner portions with the central main intake openings, and deflecting means located in rear of each of the auxiliary intake openings.

6. A fan of the class set forth, involving a plurality of blades arranged in series differing in length, side plates secured to the ends of the blades and extending to the periphery of the fan and forming rings around the periphery of the fan, main intake openings being formed at the center of the fan through the plates, the plates also having auxiliary intake openings radially arranged with relation to the center of the fan and located immediately in rear of the side edges of the longest blade of each series of blades, the longest blade of each series of blades extending inwardly into the main intake openings and the remaining shorter blades terminating at the outer wall of the central main intake openings, and deflectors at the rear portions of the auxiliary intake openings.

7. A fan of the class set forth, involving a plurality of blades arranged in series differing in length, side plates connected to the ends of the blades and having main intake openings formed at the center of the fan, the side plates being also provided with auxiliary intake openings radially arranged with respect to the center of the fan and communicating at their inner portions with the central main intake openings, the auxiliary intake openings being located immediately in rear of the side edges of the longest blades of each series, the longest blades of each series having portions thereof also radially disposed with relation to the center of the fan.

In testimony whereof I have hereunto set my hand in presence of two subscribing witnesses.

JOHN VERNER.

Witnesses:
WM. HAVEN,
F. W. TROST.